US010093361B2

(12) United States Patent
Wilson

(10) Patent No.: US 10,093,361 B2
(45) Date of Patent: Oct. 9, 2018

(54) ADJUSTABLE VEHICULAR FENDER EXTENSION

(71) Applicant: Kyle Wilson, Kelowna (CA)

(72) Inventor: Kyle Wilson, Kelowna (CA)

(*) Notice: Subject to any disclaimer, the term of this patent is extended or adjusted under 35 U.S.C. 154(b) by 0 days.

(21) Appl. No.: 15/451,122

(22) Filed: Mar. 6, 2017

(65) Prior Publication Data
US 2018/0251161 A1 Sep. 6, 2018

(51) Int. Cl.
*B62D 25/18* (2006.01)
(52) U.S. Cl.
CPC ......... *B62D 25/182* (2013.01); *B62D 25/188* (2013.01)
(58) Field of Classification Search
CPC .... B62D 25/182; B62D 25/188; B62D 25/16; B62D 25/168; B62D 25/18; B62D 25/184; B62D 25/186
See application file for complete search history.

(56) References Cited

U.S. PATENT DOCUMENTS

| 3,486,764 | A | * | 12/1969 | Beyer | B62D 25/18 280/851 |
| 4,124,221 | A | * | 11/1978 | Goings | B62D 25/188 280/851 |
| 4,904,016 | A | | 2/1990 | Tatsumi et al. | |
| 5,027,990 | A | * | 7/1991 | Sonnenberg | B60J 11/10 224/42.2 |
| 5,518,283 | A | | 5/1996 | Egelske | |
| 5,582,431 | A | | 12/1996 | Anderson | |
| 6,007,102 | A | * | 12/1999 | Helmus | B62D 25/182 280/847 |
| 6,179,312 | B1 | * | 1/2001 | Paschke | B60R 3/02 105/444 |
| 6,502,841 | B1 | | 1/2003 | Skelcher | |
| 6,565,122 | B1 | * | 5/2003 | Hansen | B62D 25/188 280/851 |
| 7,163,258 | B2 | | 1/2007 | Dryer, II et al. | |
| 7,222,884 | B2 | | 5/2007 | Callan et al. | |
| 7,845,709 | B2 | * | 12/2010 | Browne | B62D 25/182 296/180.5 |
| 8,066,304 | B2 | | 11/2011 | Ulgen | |
| 8,260,519 | B2 | * | 9/2012 | Canfield | B62D 25/16 701/74 |

(Continued)

FOREIGN PATENT DOCUMENTS

| EP | 0531711 | 12/1994 |
| GB | 430879 | 6/1935 |
| WO | 2016075573 | 5/2016 |

*Primary Examiner* — James M Dolak
(74) *Attorney, Agent, or Firm* — Richard D. Okimaw

(57) ABSTRACT

An apparatus for providing a vehicular fender extension comprise a wheel-well casing having a top surface, a bottom surface, an inside edge and an outside edge, the wheel-well casing being adapted to fit within a vehicular wheel-well, a guiderail located at the outside edge of the wheel-well casing, and an extending member slideably supported by the guiderail, the extending member having a top surface, a bottom surface, an inside edge and an outside edge, extending between first and second ends. The apparatus further comprises at least one actuator operable to move the extending member between a first position wherein the extending member is contained within the wheel-well casing, and a second position wherein the outside edge of the extending member is distal from the outside edge of the wheel-well casing.

11 Claims, 6 Drawing Sheets

(56) References Cited

U.S. PATENT DOCUMENTS

| | | |
|---|---|---|
| 8,505,943 B2 | 8/2013 | Barron |
| 8,979,102 B1 | 3/2015 | Prentice |
| 9,162,709 B2 * | 10/2015 | Gray .................... B62D 25/18 |
| 9,352,786 B1 | 5/2016 | Martin |
| 9,598,116 B2 * | 3/2017 | Riddick ............... B62D 25/182 |
| 9,963,174 B1 * | 5/2018 | Cooper ............... B62D 25/182 |
| 2006/0071494 A1 | 4/2006 | Ganz |
| 2013/0096781 A1 * | 4/2013 | Reichenbach ......... B60Q 1/326 701/49 |
| 2015/0274214 A1 * | 10/2015 | Riddick ............... B62D 25/182 280/762 |

* cited by examiner

ADJUSTABLE VEHICULAR FENDER EXTENSION

BACKGROUND OF THE INVENTION

1. Field of Invention

The present invention relates generally to vehicle fenders, and more particularly to an adjustable fender extension, extendable outward from within a wheel-well.

2. Description of Related Art

When a vehicle is in motion, the rotating tires are known to pick up debris from the road or terrain over which the vehicle is travelling, and to throw the debris off of the tire. The thrown debris can hit the sides of the vehicle, potentially causing paint or body damage.

Additionally, many jurisdictions require that the tires of all road vehicles have fenders which extend to a position to enclose the tire within the body work of the vehicle. In the case of vehicles having larger tire for off road use, it will be appreciated that such tires will extend past the body work of the vehicle in its stock configuration.

To protect a vehicle from thrown debris as well as to bring larger tires into compliance with local regulations, fender extensions may be employed, attached within the wheel-wells of the vehicle. Fender extensions may protect the undercarriage of the vehicle, but in heavy debris areas, such as off-road muddy terrain, they are minimally effective at protecting the sides of the vehicle. Additionally, many users do not find permanently mounted funder extensions to be aesthetically pleasing, and thus their use has diminished.

Other devices have been proposed to protect vehicles from flying mud and other debris. U.S. Pat. No. 8,066,304 B2 to Ulgen is an example of a retractable mud flap. This design, however, is limited in protecting the sides of a vehicle as the device only extends from the rear of the wheel well and would therefore be ineffective from preventing mud and debris from being thrown above and forward of the tire. The device of Ulgen would also be adapted to contain the tire within the fender and therefore would not place a vehicle with larger tires in compliance with many local regulations.

SUMMARY OF THE INVENTION

According to a first embodiment of the present invention there is disclosed an apparatus for providing a vehicular fender extension comprising a wheel-well casing having a top surface, a bottom surface, an inside edge and an outside edge, the wheel-well casing being adapted to fit within a vehicular wheel-well, a guiderail located at the outside edge of the wheel-well casing, and an extending member slideably supported by the guiderail, the extending member having a top surface, a bottom surface, an inside edge and an outside edge, extending between first and second ends. The apparatus further comprises at least one actuator operable to move the extending member between a first position wherein the extending member is contained within the wheel-well casing, and a second position wherein the outside edge of the extending member is distal from the outside edge of the wheel-well casing.

The at least one actuator may be a linear actuator. The at least one linear actuator may include a stationary end and a movable end. The at least one linear actuator may be arranged transverse to a length of the vehicle. The stationary end of the at least one linear actuator may be mounted to the top surface of the wheel-well casing.

The wheel-well casing may include at least one slot therethrough from the top surface to the bottom surface, at a location corresponding to the at least one linear actuator. The moveable end of the at least one linear actuator may be secured to the inside edge of the extending member with a bracket extending through the at least one slot.

The guiderail may include at least one protruding guide thereon. The extending member may include at least one track corresponding to the at least one protruding guide on the guiderail, wherein each of the at least one protruding guide is slidably received within a corresponding track.

According to a further embodiment of the present invention there is disclosed a kit for providing a vehicular fender extension comprising a wheel-well casing having a top surface, a bottom surface, an inside edge and an outside edge, the wheel-well casing adaptable to fit within a vehicular wheel-well, a guiderail locatable at the outside edge of the wheel-well casing and an extending member slideably supportable by the guiderail, the extending member having a top surface, a bottom surface, an inside edge and an outside edge, extending between first and second ends. The kit further comprises at least one actuator operable to move the extending member between a first position wherein the extending member is containable within the wheel-well casing, and a second position wherein the outside edge of the extending member is distal from the outside edge of the wheel-well casing.

According to a further embodiment of the present invention there is disclosed a method for extending a vehicle fender comprising securing a wheel-well casing having a top surface, a bottom surface, an inside edge and an outside edge within a vehicular wheel-well, providing a guiderail located at the outside edge of the wheel-well casing, and slideably supporting an extending member with the guiderail, the extending member having a top surface, a bottom surface, an inside edge and an outside edge, extending between first and second ends. The method further comprises extending at least one actuator wherein the at least one actuator extends between the wheel-well casing and the extending member, the at least one actuator operable to move the extending member between a first position wherein the extending member is contained within the wheel-well casing, and a second position wherein the outside edge of the extending member is distal from the outside edge of the wheel-well casing.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention wherein similar characters of reference denote corresponding parts in each view.

DETAILED DESCRIPTION

Figure 1:
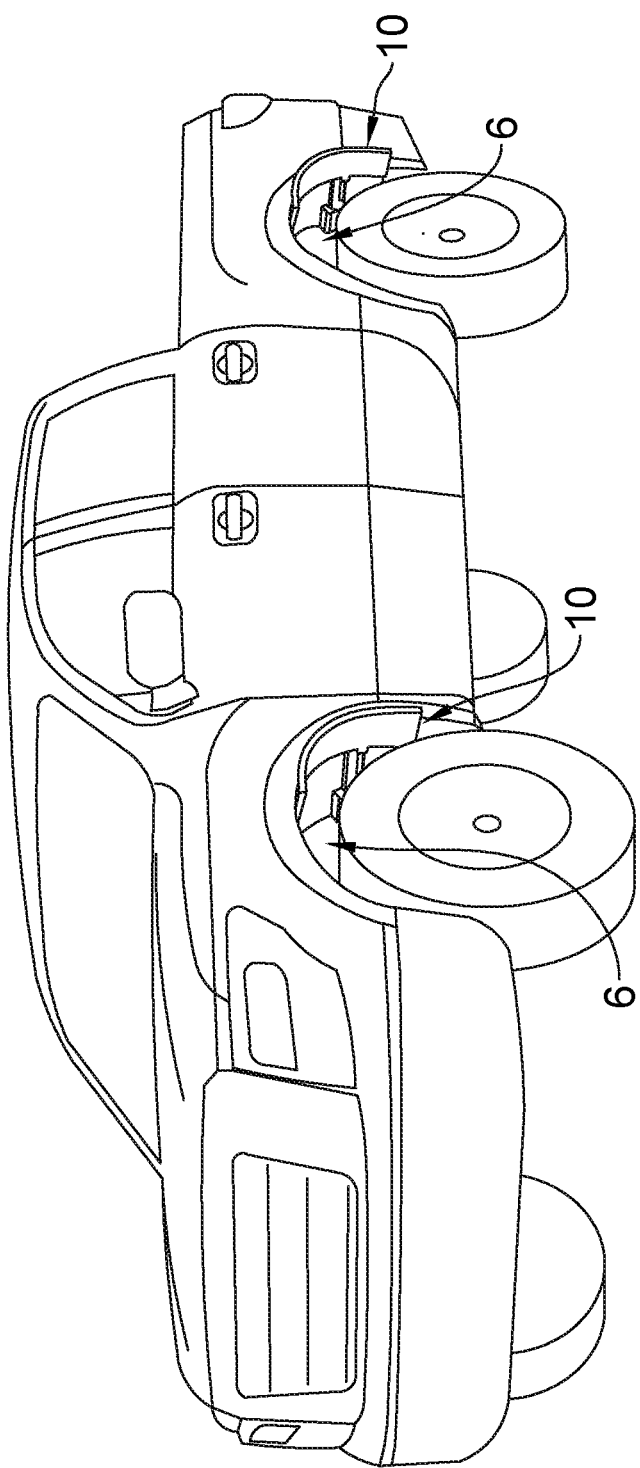
FIG. 1 is a perspective view of a pickup truck having an apparatus which provides a fender extension according to a first embodiment of the invention within each wheel-well thereof.

Referring to FIG. 1, an apparatus for providing a vehicular fender extension according to a first embodiment of the invention is shown generally at 10, located within a wheel-well 6 of a pickup truck 8. The apparatus 10 may be used to prevent road spray, such as, by way of non-limiting example, mud, rocks or sand, from hitting the side fenders of the truck 8.

Figure 2:
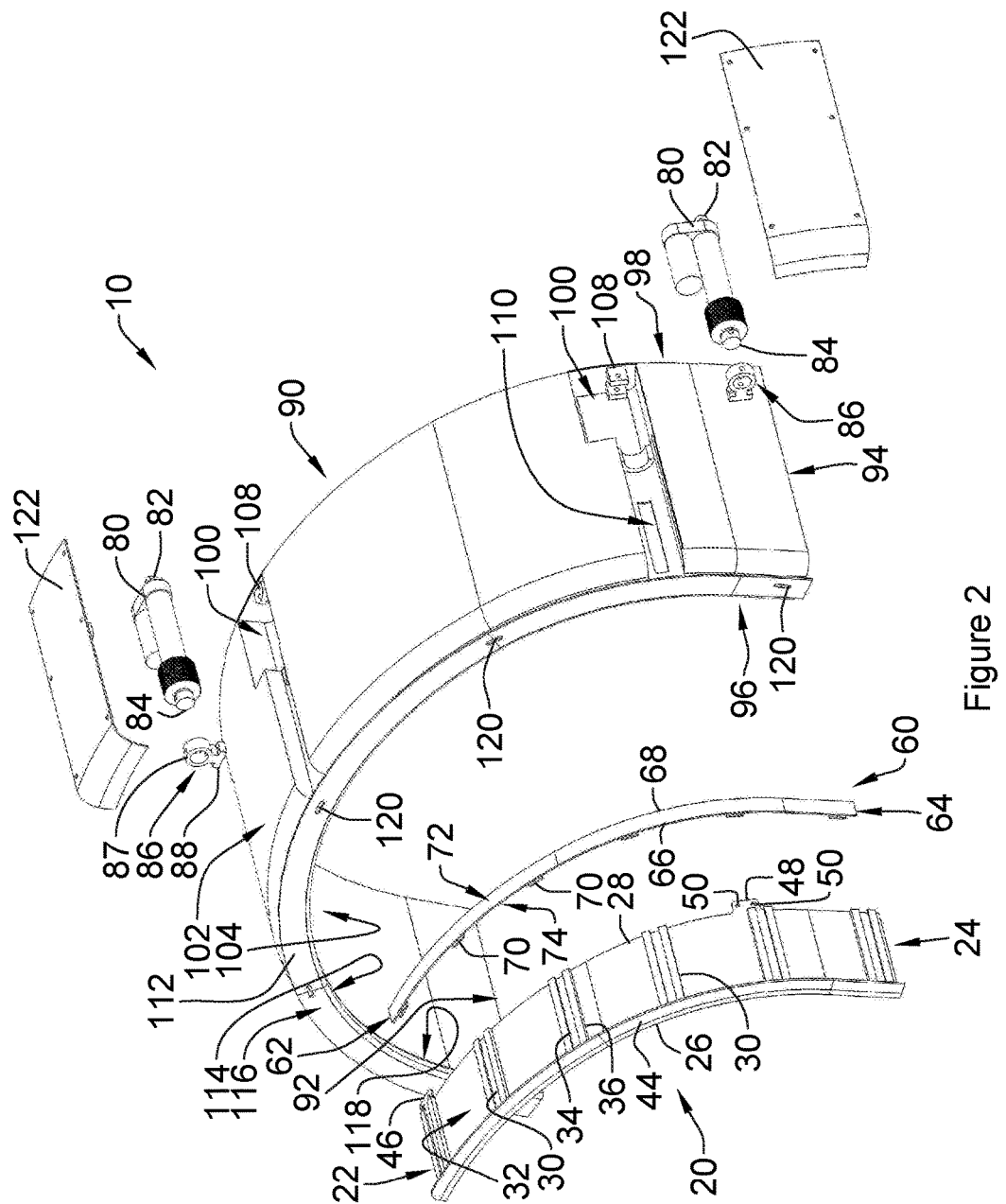
FIG. 2 is an exploded view of the apparatus of FIG. 1.
Figure 3:
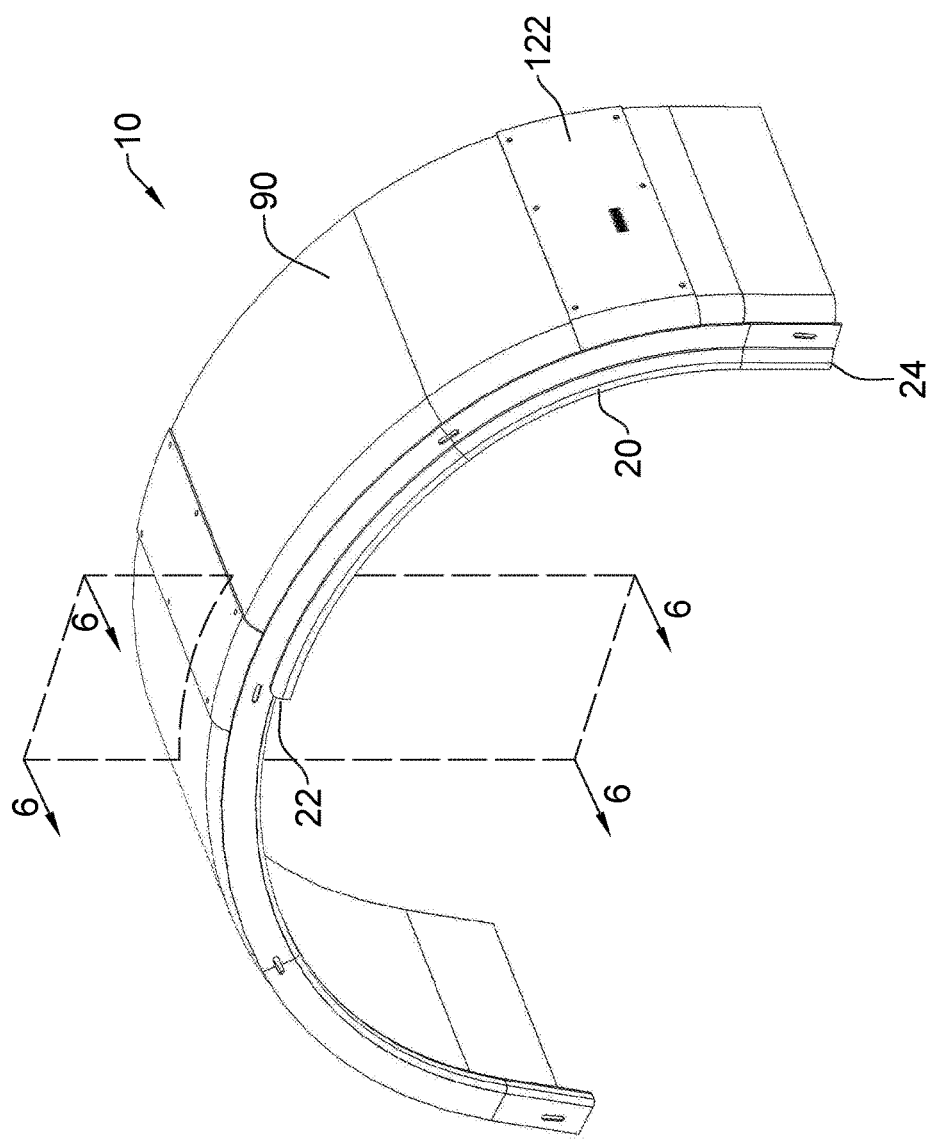
FIG. 3 is a perspective view of the apparatus of FIG. 1 in a first, retracted position.
Figure 4:
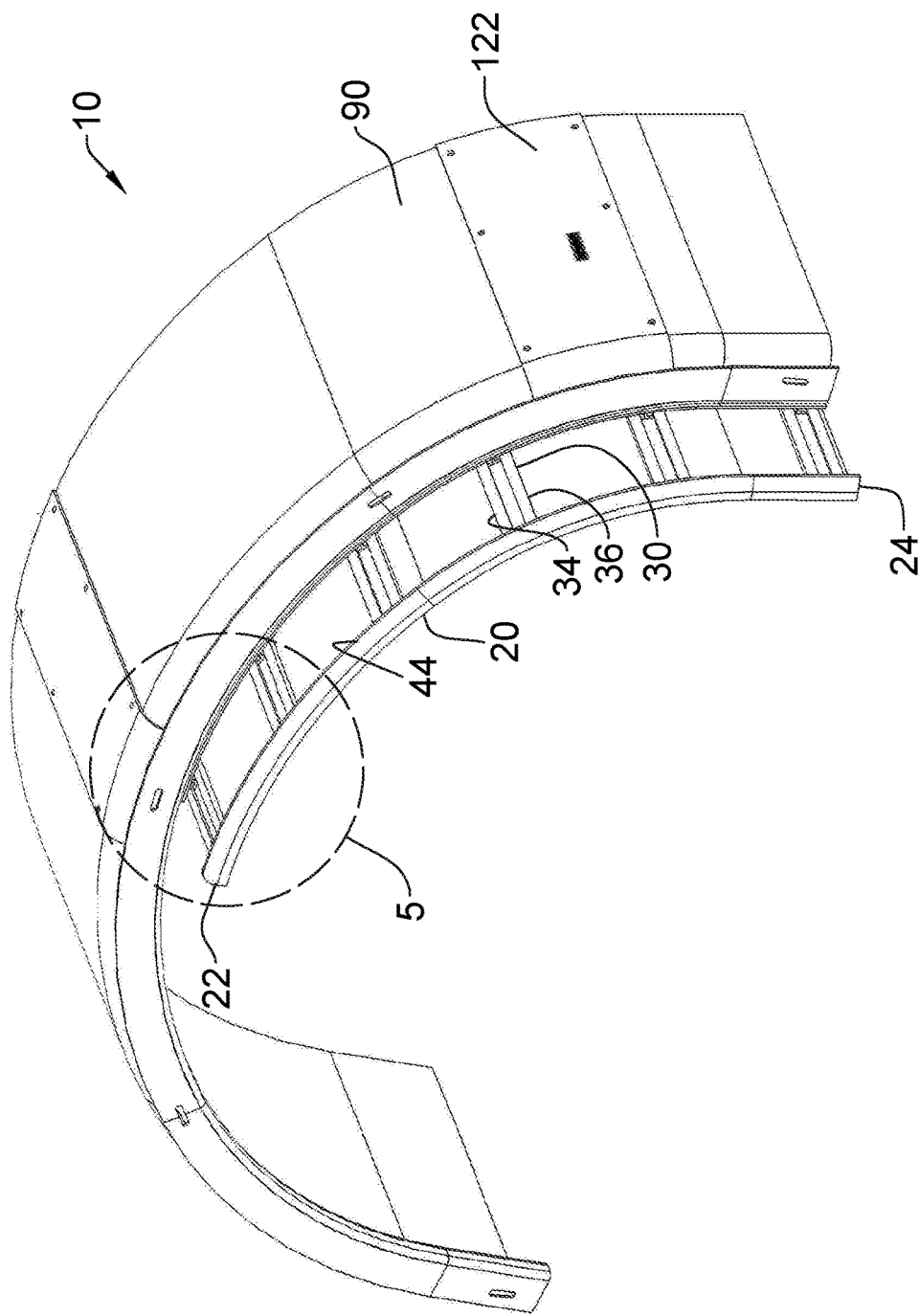
FIG. 4 is a perspective view of the apparatus of FIG. 1 in a second, extended position.

Turning to FIG. 2, an exploded perspective view of the apparatus 10 is illustrated. The apparatus 10 comprises a fender extension 20 slideably supported by a guiderail 60 mounted within a wheel-well casing 90. The fender extension 20 may be moved between a first retracted position, as illustrated in FIG. 3, and a second extended position, as illustrated in FIG. 4, by a pair of linear actuators 80, as will be described below.

Figure 5:
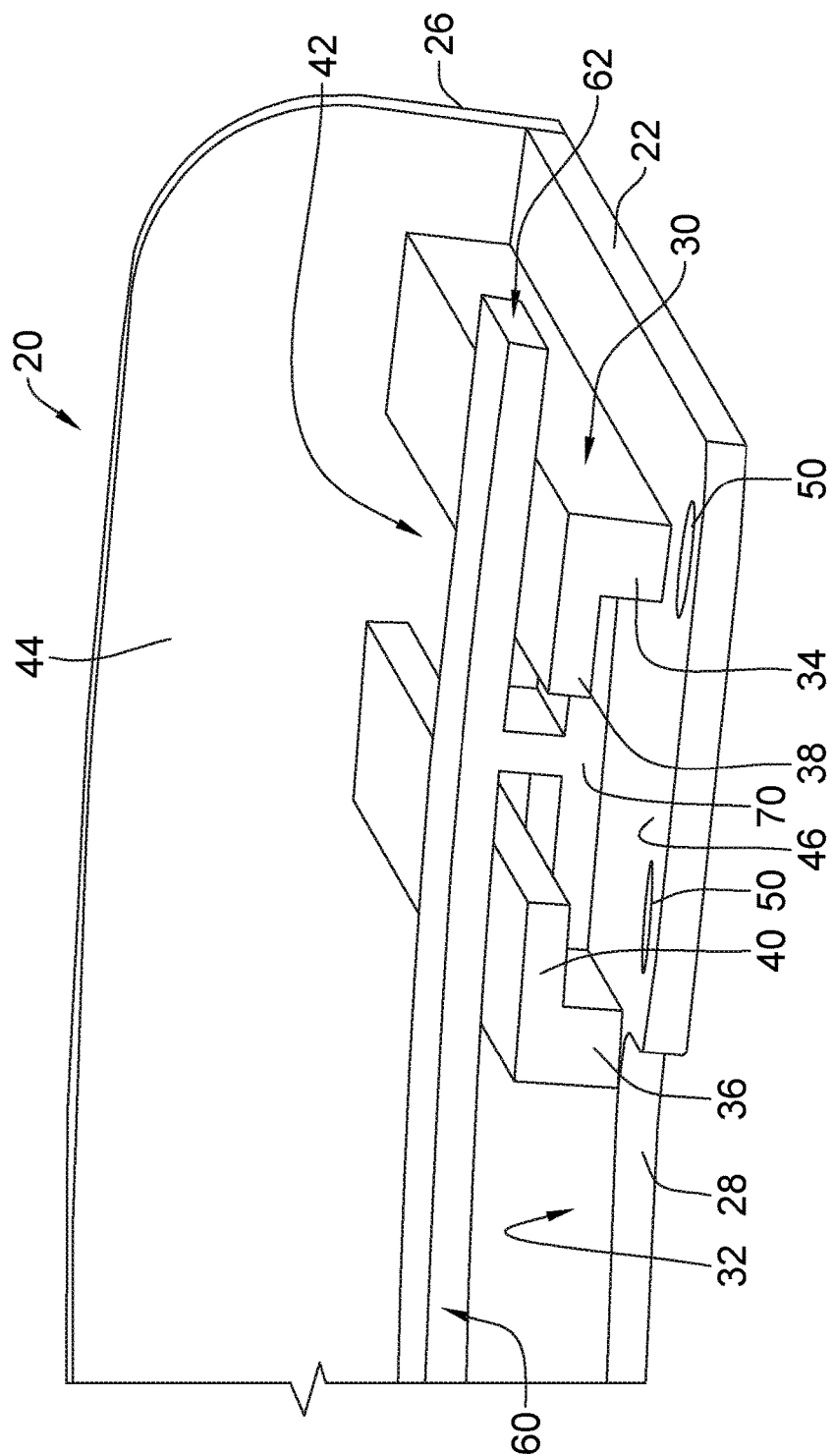
FIG. 5 is a perspective close-up view of the guiderail and fender extension at section 5 indicated in FIG. 4, viewed from the inside edge towards the outside edge.

Referring to FIG. 2, the arcuate fender extension 20, includes a top surface 32 and extends between first and second ends, 22 and 24, respectively and between outside and inside edges, 26 and 28, respectively. The top surface 32 includes a plurality of linear tracks 30 thereon. The linear tracks 30 extend between the outside and inside edges, 26 and 28. As best seen in FIG. 5, each linear track 30 comprises a first and a second upright wall, 34 and 36, respectively, with first and second inward flanges, 38 and 40, respectively, forming a T-shaped slot 42 therebetween, the purpose of which will be set out further below. An upright wall 44 extends radially outwards from the top surface 32 at the outside edge 26. First and second mounting tabs, 46 and 48, respectively, extend axially therefrom the inside edge 28 of the fender extension 20 at locations corresponding to the linear actuators 80, as will be set out below. Each mounting tab, 46 and 48, includes a pair of mounting holes 50 radially therethrough.

The arcuate guiderail 60, includes top and bottom surfaces 72 and 74, respectively, and extends between first and second ends, 62 and 64, respectively, and between outside and inside edges, 66 and 68, respectively. A plurality of T-shaped guides 70 extend from the bottom surface 74. Each guide 70 extends between the outside and inside edges, 66 and 68, and is formed at a location corresponding to the linear tracks 30 on the fender extension 20. As best seen in FIG. 5, each guide 70 is sized to engage within a slot 42, such that each linear track 30 may slide thereon each corresponding guide 70.

The arcuate wheel-well casing 90, includes top and bottom surfaces 102 and 104, respectively, and extends between first and second ends, 92 and 94, respectively, and between outside and inside edges, 96 and 98, respectively. A pair of recessed cavities 100 are included within the top surface 102. Each recessed cavity 100 extends transversely between the outside and inside edges, 96 and 98, and is sized to receive a corresponding linear actuator 80 therein. Each linear actuator 80 extends between a stationary end 82 and a moveable end 84. Each recessed cavity 100 includes a mounting bracket 108 proximate to the inside edge 98. The stationary end 82 of each linear actuator 80 is secured to the corresponding mounting bracket 108 by any known means, such as, by way of non-limiting example, with a cross bolt and cross pin, as is commonly known. A pair of covers 122 may be secured to the top surface 102 of the wheel-well casing 90 to enclose the linear actuators 80 within the recessed cavities 100, and may be secured by any known means.

Figure 6:
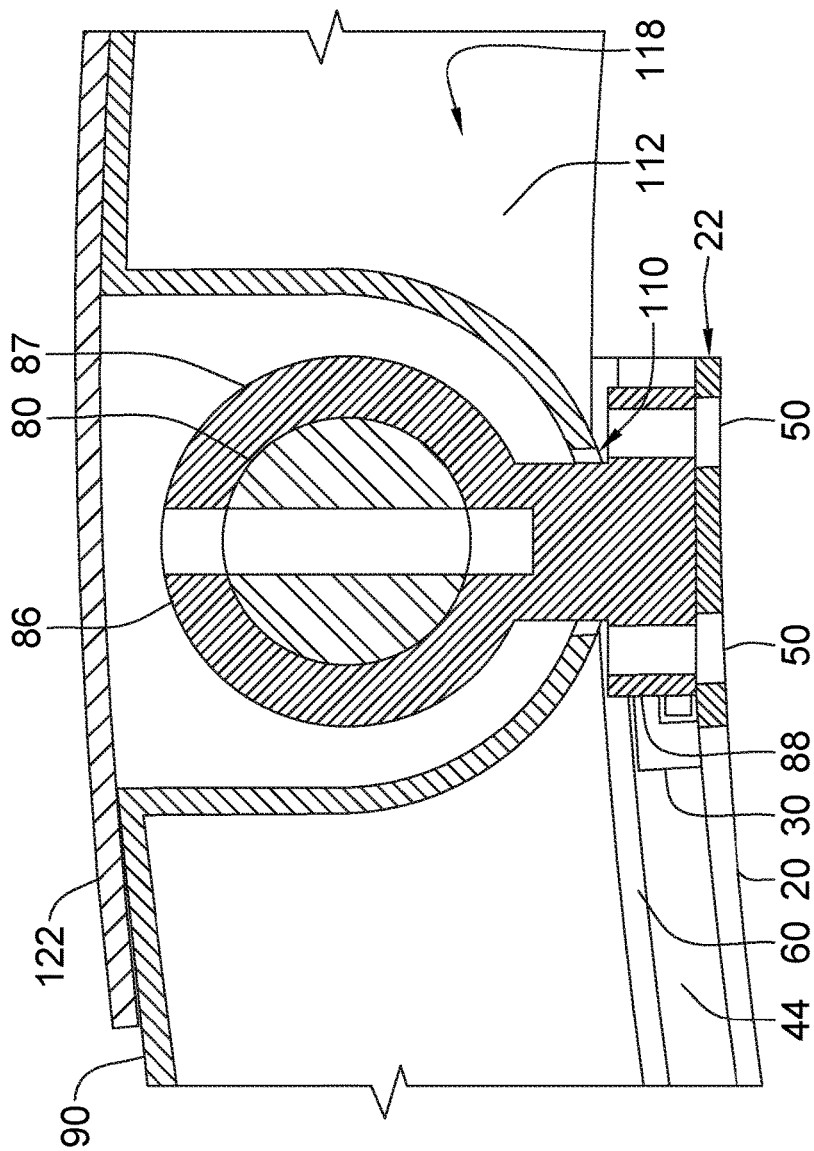
FIG. 6 is a cross-sectional close-up view of the apparatus of FIG. 1 taken along the plane 6-6 of FIG. 3.

Referring to FIGS. 2 and 6, a bracket 86 is comprised of a top portion 87 and a base portion 88. The top portion 87 is mounted to the moveable end 84 of each linear actuator 80, by any means as is commonly known. A slot 110 extends through each recessed cavity 100 from the top surface 102 to the bottom surface 104 corresponding to the range of motion of the bracket 86 mounted to the moveable end 84 of the linear actuator 80. The bracket 86 extends through the slot 110 with the base portion 88 secured to the corresponding first or second mounting tab, 46 or 48, on the fender extension 20 by any known means, such as, by way of non-limiting example, screws, bolts or welding.

The wheel-well casing 90 includes a mounting flange 112 along the outside edge 96 extending radially inward from the top surface 102, between the first and second ends, 92 and 94. The mounting flange 112 includes bottom, outside and inside surfaces 114, 116 and 118, respectively. The top surface 72 of the guiderail 60 is secured to the bottom surface 114 of the mounting flange 112 by any known means, such as, by way of non-limiting example, screws, welding or adhesives, such that the second ends 64 and 94 are aligned. A plurality of mounting holes 120 extend therethrough the mounting flange 112, between the outside and inside surfaces, 116 and 118.

The apparatus 10 is installed while in the first retracted position as illustrated in FIG. 3. The apparatus 10 is positioned such that the wheel-well casing 90 is located within a wheel-well 6 with the mounting flange 112 aligned with the outside edge of the wheel-well 6 and it is mounted thereon by any known means, such as, by way of non-limiting example, screws, bolts or clamps. It will be appreciated that the illustrated embodiment of the invention may be installed on the left-side wheel-wells of a vehicle, and a mirror of the illustrated embodiment may be installed on the right-side wheel-wells. The linear actuators 80 are connected to a control system, as is commonly known. When the linear actuators 80 are activated, they simultaneously to move the fender extension 20, supported by the guiderail 60, transversely distal to the truck 8, to the second extended position, as illustrated in FIG. 4. The linear actuators 80 may then be activated again to retract the fender extension 20 back to the first retracted position, as desired.

While specific embodiments of the invention have been described and illustrated, such embodiments should be considered illustrative of the invention only and not as limiting the invention as construed in accordance with the accompanying claims.

What is claimed is:

1. An apparatus for providing a vehicular fender extension comprising:

a wheel-well casing extending along an arcuate path and having a top surface, a bottom surface, an inside edge and an outside edge, said wheel-well casing configured to be mounted within a vehicular wheel-well;

a guiderail located at said outside edge of said wheel-well casing;

an extending member slideably supported by said guiderail, said extending member having a top surface, a bottom surface, an inside edge and an outside edge, extending between first and second ends;

at least one actuator operable to move said extending member between a first position wherein said extending member is contained within said wheel-well casing, and a second position wherein said outside edge of said extending member is distal from said outside edge of said wheel-well casing along a linear path such that all portions of said extending member are slidably displaced relative to said wheel-well casing by a common distance; and wherein said extending member extends at least partially around said vehicular wheel-well between said first and second ends.

2. The apparatus of claim 1 wherein said at least one actuator is a linear actuator.

3. The apparatus of claim 2 wherein said at least one linear actuator includes a stationary end and a movable end.

4. The apparatus of claim 2 wherein said at least one linear actuator is arranged transverse to a length of the vehicle.

5. The apparatus of claim 3 wherein said stationary end of said at least one linear actuator is mounted to said top surface of said wheel-well casing.

6. The apparatus of claim 5 wherein said wheel-well casing includes at least one slot therethrough from said top surface to said bottom surface, at a location corresponding to said at least one linear actuator.

7. The apparatus of claim 6 wherein said moveable end of said at least one linear actuator is secured to said inside edge of said extending member with a bracket extending through said at least one slot.

8. The apparatus of claim 1 wherein said guiderail includes at least one protruding T-shaped guide thereon.

9. The apparatus of claim 8 wherein said extending member includes at least one track corresponding to said at least one protruding T-shaped guide on said guiderail, wherein each of said at least one protruding T-shaped guide is slidably received within the at least one track.

10. A kit for providing a vehicular fender extension comprising:
a wheel-well casing extending along an arcuate path and having a top surface, a bottom surface, an inside edge and an outside edge, said wheel-well casing configured to be mounted within a vehicular wheel-well;
a guiderail locatable at said outside edge of said wheel-well casing;
an extending member slideably supportable by said guiderail, said extending member having a top surface, a bottom surface, an inside edge and an outside edge, extending between first and second ends;
at least one actuator operable to move said extending member between a first position wherein said extending member is containable within said wheel-well casing, and a second position wherein said outside edge of said extending member is distal from said outside edge of said wheel-well casing along a linear path such that all portions of said extending member are slidably displaced relative to said wheel-well casing by a common distance and;
wherein said extending member extends at least partially around said vehicular wheel-well between said first and second ends.

11. A method for extending a vehicle fender comprising:
securing a wheel-well casing extending along an arcuate path and having a top surface, a bottom surface, an inside edge and an outside edge within a vehicular wheel-well;
providing a guiderail located at said outside edge of said wheel-well casing;
slideably supporting an extending member with said guiderail, said extending member having a top surface, a bottom surface, an inside edge and an outside edge, extending between first and second ends, wherein said extending member extends at least partially around said vehicular wheel-well between said first and second ends; and
extending at least one actuator wherein said at least one actuator extends between said wheel-well casing and said extending member, said at least one actuator operable to move said extending member between a first position wherein said extending member is contained within said wheel-well casing, and a second position wherein said outside edge of said extending member is distal from said outside edge of said wheel-well casing along a linear path such that all portions of said extending member are slidably displaced relative to said wheel-well casing by a common distance.

* * * * *